(12) United States Patent
Jacobson et al.

(10) Patent No.: US 10,066,700 B2
(45) Date of Patent: Sep. 4, 2018

(54) POWER TRANSFER ASSEMBLY

(71) Applicant: Caterpillar Inc., Peoria, IL (US)

(72) Inventors: Evan Earl Jacobson, Edwards, IL (US); Koti Ratnam Padarthy, Edwards, IL (US); James Sheridan Chase, Chillicothe, IL (US); Anuj Jhalaria, San Jose, CA (US)

(73) Assignee: Caterpillar Inc., Deerfield, IL (US)

( * ) Notice: Subject to any disclaimer, the term of this patent is extended or adjusted under 35 U.S.C. 154(b) by 189 days.

(21) Appl. No.: 15/218,173

(22) Filed: Jul. 25, 2016

(65) Prior Publication Data

US 2018/0023660 A1 Jan. 25, 2018

(51) Int. Cl.
| | |
|---|---|
| G05B 11/32 | (2006.01) |
| F16F 15/315 | (2006.01) |
| F16H 7/02 | (2006.01) |
| F16H 7/06 | (2006.01) |
| F16H 1/02 | (2006.01) |
| B60K 17/02 | (2006.01) |
| B60K 25/02 | (2006.01) |

(52) U.S. Cl.
CPC ............ *F16F 15/315* (2013.01); *B60K 17/02* (2013.01); *B60K 25/02* (2013.01); *F16H 1/02* (2013.01); *F16H 7/02* (2013.01); *F16H 7/06* (2013.01); *B60K 2025/022* (2013.01); *F16F 2230/18* (2013.01)

(58) Field of Classification Search
CPC ....... F16F 15/315; F16F 2230/18; F16H 1/02; F16H 7/02; F16H 7/06; B60K 17/02; B60K 25/02; B60K 2025/022

USPC .......................................... 701/67; 123/192.2
See application file for complete search history.

(56) References Cited

U.S. PATENT DOCUMENTS

| | | | |
|---|---|---|---|
| 4,262,552 A | 4/1981 | Honda | |
| 4,372,262 A | 2/1983 | Kaniut | |
| 4,748,868 A | 6/1988 | Kobayashi et al. | |
| 4,768,607 A * | 9/1988 | Molina | F02B 73/00 180/165 |
| 5,590,568 A | 1/1997 | Takara | |
| 5,816,924 A | 10/1998 | Kajitani et al. | |
| 6,192,851 B1 | 2/2001 | Asahara et al. | |
| (Continued) | | | |

FOREIGN PATENT DOCUMENTS

| | | |
|---|---|---|
| GB | 780062 | 7/1957 |
| JP | S58131445 | 8/1983 |
| JP | 2008296630 | 12/2008 |

*Primary Examiner* — Marguerite McMahon
(74) *Attorney, Agent, or Firm* — Jeff A. Greene (57) ABSTRACT

A power transfer assembly for an engine is provided. The power transfer assembly includes a first flywheel coupled to a crankshaft of the engine. The power transfer assembly includes a second flywheel selectively coupled to the first flywheel. The power transfer assembly also includes a first transmission unit coupled to the first flywheel and the second flywheel. The first transmission unit is adapted to selectively transfer mechanical power between the first flywheel and the second flywheel. The power transfer assembly further includes a second transmission unit coupled to the first transmission unit, the second flywheel, and an engine accessory. The second transmission unit is adapted to selectively transfer mechanical power between any one of the first transmission unit and the second flywheel, and the engine accessory.

16 Claims, 4 Drawing Sheets

(56) References Cited

U.S. PATENT DOCUMENTS

| | | |
|---|---|---|
| 7,267,028 B2 | 9/2007 | Gabrys |
| 8,240,231 B2 | 8/2012 | Kwok |
| 2014/0046538 A1* | 2/2014 | Siegel .................... G05B 11/32 |
| | | 701/36 |
| 2016/0040727 A1* | 2/2016 | Singh ..................... F16D 13/58 |
| | | 192/48.1 |
| 2016/0230836 A1* | 8/2016 | Maier ..................... F16D 13/38 |

* cited by examiner

POWER TRANSFER ASSEMBLY

TECHNICAL FIELD

The present disclosure relates to a power transfer assembly. More particularly, the present disclosure relates to the power transfer assembly for an engine.

BACKGROUND

Engine accessories, such as an alternator, an air compressor, an air conditioning compressor, a water pump, an oil pump, and so on are generally driven by the engine. In one situation, in order to extend an engine life, reduce fuel consumption, limit emissions, and so on, the engine may be shut off instead of running the engine at an idle speed. As a result, the engine powered accessories may also stop and may require an engine restart in order to power the accessories alone. Alternatively, the accessories may be designed to be electrically driven. However, such an arrangement may require a dedicated electrical power source in turn increasing system cost, service/replacement cost, system bulk, packaging complexity, and so on.

Typically, a flywheel is employed in order to suppress oscillation in torque and/or speed of the engine resulting from sequential firing of cylinders of the engine. During operation of the engine, a number of applications may subject the engine to a load in excess of a rated power of the engine. In such a situation, inertia/kinetic energy of the flywheel may be used in order to compensate for the excess load demand. However, there are practical limits to the amount of kinetic energy that may be stored in the flywheel. The limitations may include a packaging space, a journal bearing capacity for overhung load, resistance to engine starting, and so on.

U.S. Pat. No. 4,372,262 describes an apparatus for stopping and restarting a motor vehicle by means of a flywheel. The flywheel is alternately clutched to an engine crankshaft to be driven thereby or declutched to rotate freely for subsequent driving of an engine to restart the engine. The engine is shut off in response to release of an accelerator pedal deactivating switches controlling a clutch mechanism after a predetermined time delay longer than a time normally required for a gear shift change.

SUMMARY OF THE DISCLOSURE

In an aspect of the present disclosure, a power transfer assembly for an engine is provided. The power transfer assembly includes a first flywheel coupled to a crankshaft of the engine. The power transfer assembly includes a second flywheel selectively coupled to the first flywheel. The power transfer assembly also includes a first transmission unit coupled to the first flywheel and the second flywheel. The first transmission unit is adapted to selectively transfer mechanical power between the first flywheel and the second flywheel. The power transfer assembly further includes a second transmission unit coupled to the first transmission unit, the second flywheel, and an engine accessory. The second transmission unit is adapted to selectively transfer mechanical power between any one of the first transmission unit and the second flywheel, and the engine accessory.

In another aspect of the present disclosure, an engine is provided. The engine includes a cylinder head and an engine block. The engine includes a cylinder provided within the engine block and a piston provided within the cylinder. The engine also includes a crankshaft coupled to the piston. The engine further includes a power transfer assembly. The power transfer assembly includes a first flywheel coupled to the crankshaft. The power transfer assembly includes a second flywheel selectively coupled to the first flywheel. The power transfer assembly also includes a first transmission unit coupled to the first flywheel and the second flywheel. The first transmission unit is adapted to selectively transfer mechanical power between the first flywheel and the second flywheel. The power transfer assembly further includes a second transmission unit coupled to the first transmission unit, the second flywheel, and an engine accessory. The second transmission unit is adapted to selectively transfer mechanical power between any one of the first transmission unit and the second flywheel, and the engine accessory.

In yet another aspect of the present disclosure, a method for controlling a power transfer assembly is provided. The power transfer assembly includes a first flywheel selectively coupled to a second flywheel. The method includes monitoring a first speed of the first flywheel. The method includes monitoring a second speed of the second flywheel. The method also includes synchronizing a match speed between the first flywheel and the second flywheel. The method further includes proportionately engaging the first flywheel and the second flywheel based, at least in part, on a difference between any one of the first speed and the second speed, and the match speed.

Other features and aspects of this disclosure will be apparent from the following description and the accompanying drawings.

DETAILED DESCRIPTION

Figure 1:
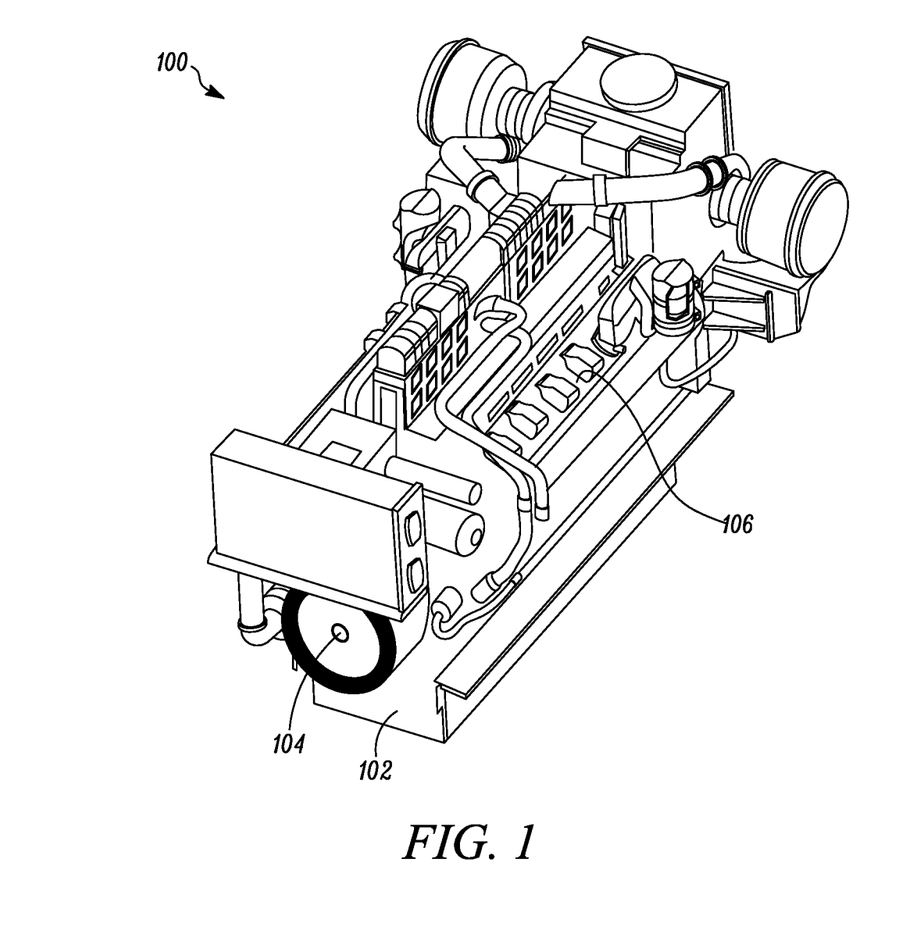
FIG. 1 is a perspective view of an exemplary engine, according to one embodiment of the present disclosure.

Wherever possible, the same reference numbers will be used throughout the drawings to refer to the same or the like parts. Referring to FIG. 1, an exemplary engine 100 is illustrated. The engine 100 may be an internal combustion engine powered by any fuel such as, natural gas, diesel, gasoline, and/or a combination thereof. In one embodiment, the engine 100 may be employed by a machine (not shown). It should be recognized that the concepts of the present disclosure may be suitably applicable to any type and configuration of the engine 100. The engine 100 and/or the machine may be used for applications including, but not limited to, power generation, transportation, construction, agriculture, forestry, aviation, marine, material handling, and waste management.

The engine 100 includes an engine block 102. The engine block 102 includes one or more cylinders (not shown) provided therein. The cylinders may be arranged in any configuration such as inline, radial, "V", and so on. The engine 100 further includes a piston (not shown) movably disposed within each of the cylinders. Each of the pistons may be coupled to a crankshaft 104 of the engine 100. Energy generated from combustion of the fuel inside the cylinders may be converted to rotational energy of the crankshaft 104 by the pistons.

The engine 100 also includes a cylinder head 106 mounted on the engine block 102. The cylinder head 106 may house one or more components and/or systems (not shown) of the engine 100 such as a valve train, an intake manifold, an exhaust manifold, sensors, and so on. Additionally, the engine 100 may include various other components and/or systems (not shown) such as a crankcase, a fuel system, an air system, a cooling system, a turbocharger, an exhaust gas recirculation system, an exhaust gas aftertreatment system, other peripheries, and so on.

Figure 2:
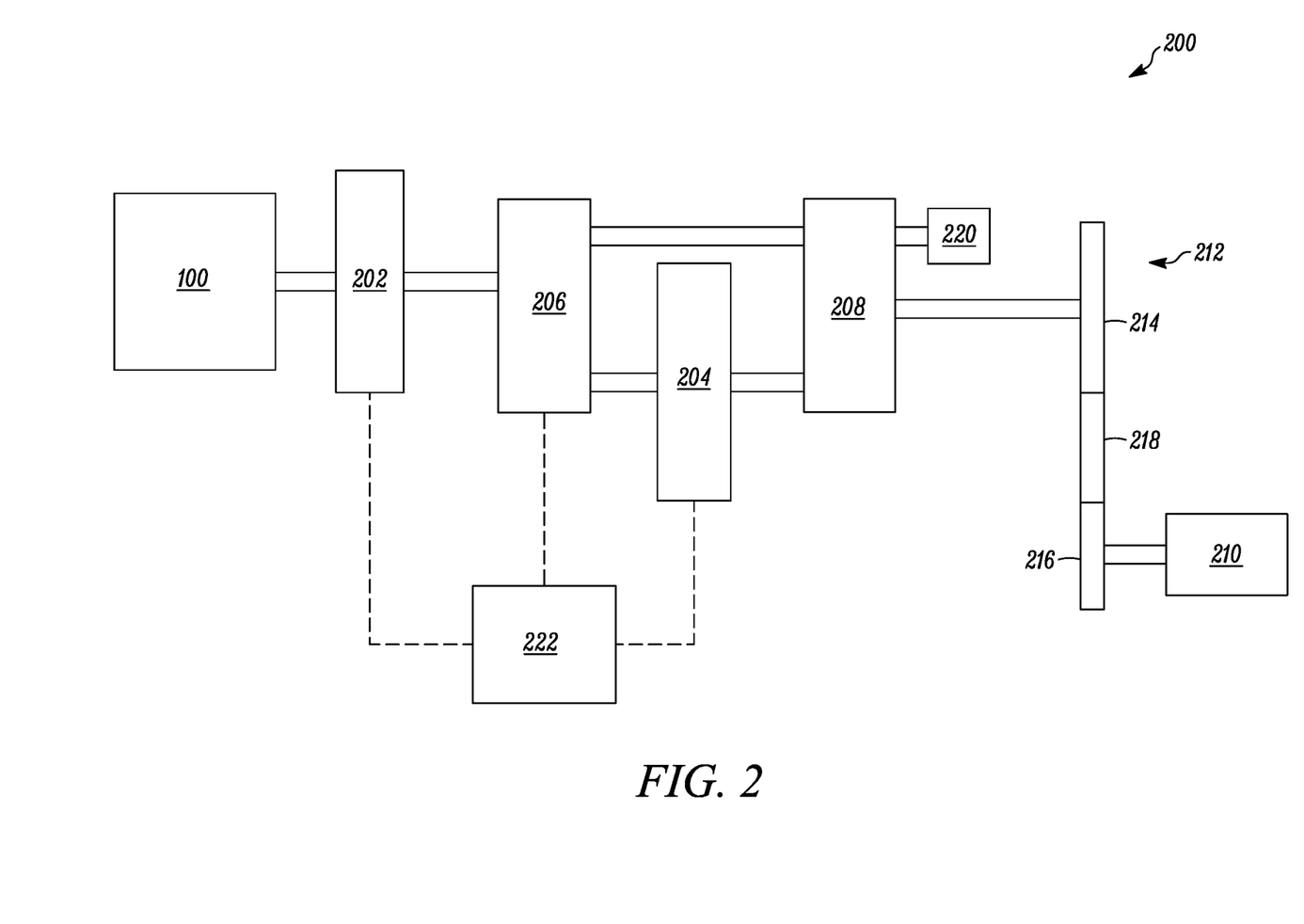
FIG. 2 is a schematic representation of a power transfer assembly of the engine of FIG. 1, according to one embodiment of the present disclosure.

Referring to FIG. 2, a power transfer assembly 200 for the engine 100 is illustrated. The power transfer assembly 200 includes a first flywheel 202 coupled to the crankshaft 104 of the engine 100. The first flywheel 202 rotates at a first speed along with the crankshaft 104. The power transfer assembly 200 also includes a second flywheel 204 selectively coupled to the first flywheel 202. The second flywheel 204 rotates at a second speed. The second flywheel 204 is a high speed flywheel adapted to rotate at a speed higher than a speed to the first flywheel 202. Each of the first flywheel 202 and the second flywheel 204 may be disc-like members.

The power transfer assembly 200 further includes a first transmission unit 206 coupled to the first flywheel 202 and the second flywheel 204. In the illustrated embodiment, the first transmission unit 206 is directly coupled to the first flywheel 202. In other embodiments, the first transmission unit 206 may be indirectly coupled to the first flywheel 202 and will be explained later in detail. The first transmission unit 206 is adapted to selectively transfer mechanical power between the first flywheel 202 and the second flywheel 204.

More specifically, the first transmission unit 206 includes at least a first clutch (not shown) and a first gear set (not shown). The first clutch may include a first plate and a second plate. The first plate and the second plate may be coupled to the first flywheel 202 and the second flywheel 204 respectively. The first plate and the second plate are adapted to selectively engage or disengage with each other and, in turn, selectively transfer power therebetween. In other embodiments, the first transmission unit 206 may include multiple clutches (not shown) associated with the first flywheel 202, the second flywheel 204, and/or the first gear set based on application requirements. The multiple clutches may be adapted to selectively transfer the mechanical power between the first flywheel 202 and the second flywheel 204.

The first gear set may include one or more gears disposed between the first plate and the first flywheel 202. Accordingly, the first gear set is adapted to increase a speed of the first plate relative to the first flywheel 202. The first gear set may also include one or more gears disposed between the second plate and the second flywheel 204. Accordingly, the first gear set is adapted to increase a speed of the second flywheel 204 relative to the second plate.

In an engaged configuration of the first clutch, a rotational motion of the first flywheel 202 is transferred to the second flywheel 204 and vice versa. Moreover, the first gear set enables the second flywheel 204 to rotate at a higher speed relative to the first flywheel 202. In a disengaged configuration of the first clutch, the transfer of mechanical power from the first flywheel 202 to the second flywheel 204, and vice versa, is discontinued.

The power transfer assembly 200 also includes a second transmission unit 208 coupled to the first transmission unit 206, the second flywheel 204, and an engine accessory 210. The second transmission unit 208 is adapted to selectively transfer mechanical power between any one of the first transmission unit 206 and the second flywheel 204, and the engine accessory 210 based on application requirements. More specifically, in one embodiment, the second transmission unit 208 may selectively transfer mechanical power from the first flywheel 202 to the engine accessory 210 via the first transmission unit 206. In another embodiment, the second transmission unit 208 may transfer mechanical power from the second flywheel 204 to the engine accessory 210.

The second transmission unit 208 includes a second clutch (not shown) and a second gear set (not shown). In one embodiment, the second clutch is adapted to selectively engage the second flywheel 204 and the engine accessory 210. In another embodiment, the second clutch is adapted to selectively engage the first transmission unit 206 and the engine accessory 210. The second gear set may include one or more gears disposed between the second clutch and the second flywheel 204. Accordingly, the second gear set is adapted to reduce a speed of the second clutch relative to the second flywheel 204.

The second gear set may also include one or more gears disposed between the second clutch and the engine accessory 210. Accordingly, the second gear set is adapted to reduce a speed of the engine accessory 210 relative to the second clutch. Additionally, the second gear set may also include one or more gears disposed between the first transmission unit 206 and the engine accessory 210. Accordingly, the second gear set is adapted to increase or reduce the speed of the engine accessory 210 relative to the first transmission unit 206, based on application requirements.

The power transfer assembly 200 includes one or more engine accessories 210 coupled to the second transmission unit 208. The engine accessory 210 may include, but not limited to, a pump, a fan, an alternator, a Heating, Ventilation and Air Conditioning (HVAC) unit, and/or a combination thereof based on application requirements. In the illustrated embodiment, the engine accessory 210 is coupled to the second transmission unit 208 via a belt-pulley unit 212. In other embodiments, the engine accessory 210 may be directly coupled to the second transmission unit 208.

The belt-pulley unit 212 includes a first drive pulley 214, a second drive pulley 216, and a belt 218 connecting the first and second drive pulleys 214, 216. The first drive pulley 214 is coupled to the second transmission unit 208. The second drive pulley 216 is coupled to the engine accessory 210. In one embodiment, the belt-pulley unit 212 may be adapted to change the speed of the engine accessory 210 relative to the second transmission unit 208. In another embodiment, the belt-pulley unit 212 may be adapted to drive multiple engine accessories 210 simultaneously based on application requirements. In other embodiments, the engine accessory 210 may be coupled to the second transmission unit 208 either by a gear set (not shown), a chain-sprocket unit (not shown), and/or a combination thereof.

Additionally, the power transfer assembly 200 includes a Motor Generator Unit (MGU) 220. The MGU 220 is coupled to the second flywheel 204 via the second transmission unit 208. In one situation, during starting of the engine 100, the MGU 220 is adapted to work as a motor for rotating the second flywheel 204. In such a situation, the first clutch of the first transmission unit 206 may be disengaged in order to allow the second flywheel 204 to spin freely along with the MGU 220. Once, the second flywheel 204 may have attained a predetermined speed, the first clutch may be engaged in order to transfer the mechanical power from the second flywheel 204 to the first flywheel 202 and thereby provide inertial starting of the engine 100. Simultaneously, the second transmission unit 208 may be disengaged to disconnect the MGU 220 and the second flywheel 204 at the predetermined speed of the second flywheel 204.

In another situation, during operation of the engine 100, the MGU 220 is adapted to work as an alternator for generating electrical power. Accordingly, in one embodiment, the MGU 220 may be driven by the second flywheel 204 via the second transmission unit 208. In another embodiment, the MGU 220 may be driven by the first flywheel 202 via the first transmission unit 206 and the second transmission unit 208. The electrical power generated by the MGU 220 in such an operational state may be further used for powering other engine accessories 210, battery charging, and so on based on application requirements.

The power transfer assembly 200 also includes a controller 222. The controller 222 is coupled to the first flywheel 202 and the second flywheel 204. The controller 222 is also coupled to the first transmission unit 206. More specifically, the controller 222 is coupled to the first plate and the second plate of the first clutch of the first transmission unit 206. The controller 222 is configured to engage, disengage, or proportionately engage the first clutch in order to transfer the mechanical power between the first flywheel 202 and the second flywheel 204. More specifically, the controller 222 is configured to engage, disengage, or proportionately engage the first transmission unit 206 based on various parameters, which will be described in detail herein.

In other embodiments when the first transmission unit 206 may include the multiple clutches, the controller 222 may be coupled to each of the multiple clutches. Accordingly, the controller 222 may be configured to engage, disengage, or proportionately engage each of the multiple clutches, based on application requirements, in order to transfer the mechanical power between the first flywheel 202 and the second flywheel 204.

The power transfer assembly 200 is adapted to operate in conjunction with various operating conditions of the engine 100 to provide mechanical power to the engine accessory 210. The controller 222 is configured to monitor the first speed of the first flywheel 202. The controller 222 is configured to monitor the second speed of the second flywheel 204. Accordingly, the controller 222 may receive signals indicative of the first and second speeds of the first and second flywheels 202, 204 via rotational speed sensors (not shown) associated therewith.

The controller 222 is also configured to synchronize a match speed between the first flywheel 202 and the second flywheel 204. The match speed refers to a speed of the first transmission unit 206 and, more specifically, to the first clutch. The controller 222 is also configured to proportionately engage the first flywheel 202 and the second flywheel 204 based, at least in part, on a difference between any one of the first speed and the second speed, and the match speed.

During a first operating condition such as when the engine 100 is starting, the first flywheel 202 and the second flywheel 204 may be rest. Accordingly, the controller 222 is configured to monitor and determine the first speed and the second speed of the first flywheel 202 and the second flywheel 204 respectively as zero. In such a situation, the engine 100 is started conventionally thereby rotating the first flywheel 202. The first flywheel 202 rotates at the first speed thereby driving the corresponding gears of the first gear set and the first plate of the first clutch.

The controller 222 is configured to synchronize the match speed between the first flywheel 202 and the second flywheel 204. The match speed may be such that engagement of the first clutch at the match speed may result in minimum slip across the first clutch. The controller 222 is further configured to engage the first clutch proportionately so as to increase the second speed of the second flywheel 204 up to the match speed. Once the second speed becomes approximately equal to the match speed, the controller 222 is configured to fully engage the first clutch. As such, the second speed of the second flywheel 204 matches the first speed of the first flywheel 202. The second flywheel 204 is now allowed to accelerate along with the first flywheel 202 and the engine 100. The second flywheel 204 further powers the engine accessory 210 via the second transmission unit 208.

It should be noted that during the first operating condition, the engine 100 may be allowed to accelerate from rest at a predetermined acceleration rate. In such a situation, if an operator may demand a higher acceleration rate, the controller 222 may be configured to disengage the first transmission unit 206 in order to free the engine 100 from an additional load of the second flywheel 204. As a result, the engine 100 may freely accelerate at the rate demanded by the operator. The controller 222 may be further configured to engage the first transmission unit 222 in a situation when the acceleration rate may be approximately equal or lower than the predetermined acceleration rate and/or after a predetermined time period.

During a second operating condition, such as deceleration of the engine 100, the controller 222 may be configured to monitor a position of a throttle (not shown) associated with the engine 100. In another embodiment, the controller 222 may be configured to monitor a reduction in the first speed of the first flywheel 202 with respect to the match speed. Accordingly, the second operating condition is such that the command of the throttle is low idle or the monitored reduction in the first speed of the first flywheel 202 indicates non-working speed of the machine.

In such a situation, the controller 222 is configured to disengage the first flywheel 202 and the second flywheel 204 based, at least in part, on the monitored reduction in the first speed with respect to the match speed. Specifically, the controller 222 is configured to disengage the first clutch of the first transmission unit 206 to disconnect the first flywheel 202 and the second flywheel 204. As such, discharge of kinetic energy of the second flywheel 204 to the first flywheel 202 and the engine 100 may be discontinued. Further, during the second operating condition, the second flywheel 204 may drive the engine accessories 210 from the stored kinetic energy therein.

During a third operating condition of the engine 100, such as acceleration of the engine 100, the command of the throttle may be increased. In another embodiment, the first speed of the first flywheel 202 may increase with respect to the match speed during the third operating condition. Specifically, as the command to the throttle increases, the engine 100 may start accelerating, thereby, accelerating the first flywheel 202 and increasing the first speed thereof. Accordingly, the first plate coupled to the first flywheel 202 via the first gear set may also accelerate.

In such a situation, the controller 222 is configured to monitor the increase in the first speed of the first flywheel 202 with respect to the match speed. Accordingly, the controller 222 is configured to proportionately engage the first flywheel 202 and the second flywheel 204 based, at least in part, on the monitoring and a difference between the first speed and the match speed. More specifically, when the second flywheel 204 is already in motion, the second plate coupled to the second flywheel 204 via the first gear set may also rotate. In such a situation, the first clutch may be re-engaged when the first speed of the first flywheel 202 may be approximately equal to the second speed of the second flywheel 204 with a minimum slip across the first clutch.

Further, the controller 222 may be configured to determine an acceleration rate of the first flywheel 202/engine 100 in order to estimate when the first speed of the first flywheel 202 may be approximately equal to the match speed between the first flywheel 202 and the second flywheel 204. The controller 222 may also be configured to factor in a time required for the engagement of the first clutch. Accordingly, the controller 222 may be configured to determine an appropriate time to re-engage the first clutch in order to minimize the slip across the first clutch.

During a fourth operating condition, the engine 100 may be rapidly restarted. Rapid restarting may refer to restarting of the engine 100 after a time period such that the first flywheel 202 and the engine 100 may be at rest whereas the second flywheel 204 may continue to spin due the stored kinetic energy therein. During the fourth operating condition, the controller 222 is configured to sense and determine the first speed of the first flywheel 202 as zero. The controller 222 is also configured to sense and determine the second speed of the second flywheel 204 greater than or equal to a predetermined speed. In such a situation, the second speed of the second flywheel 204 may be used to provide inertial starting of the engine 100.

Further, the controller 222 is configured to proportionately engage the first flywheel 202 and the second flywheel 204 based, at least in part, on a difference between the first speed and the second speed. More specifically, the controller 222 is configured to re-engage the first clutch in order to transfer the kinetic energy of the second flywheel 204 to the first flywheel 202. As the first flywheel 202 may attain a fueling speed, the first clutch may be disengaged again. The fueling speed may refer to a speed of the first flywheel 202/engine 100 such that fueling to the engine 100 may be initiated. As the engine 100 may be started and may further accelerate, the first clutch may be re-engaged in a manner described in relation to the first operating condition.

The second transmission unit 208 may be manually controlled by an operator in order to operate the engine accessory 210 via the second flywheel 204 or the first transmission unit 206. Alternatively, the second transmission unit 208 may be electronically operated by the operator via the controller 222. As such, the second transmission unit 208 may be engaged/disengaged in a manner similar to the first operating condition, the second operating condition, the third operating condition, and/or the fourth operating condition in order to drive the engine accessory 210 based on application requirements.

The controller 222 may be an electronic controller that operates in a logical fashion to perform operations, execute control algorithms, store and retrieve data and other desired operations. The controller 222 may include or access memory, secondary storage devices, processors, and any other components for running an application. The memory and secondary storage devices may be in the form of read-only memory (ROM) or random access memory (RAM) or integrated circuitry that is accessible by the controller 222. Various other circuits may be associated with the controller 222 such as power supply circuitry, signal conditioning circuitry, driver circuitry, and other types of circuitry. The controller 222 may be a single controller or may include more than one controller disposed to control various functions and/or features of the engine 100 and/or the machine. The term "controller" is meant to be used in its broadest sense to include one or more controllers and/or microprocessors that may be associated with the engine 100 and/or the machine and that may cooperate in controlling various functions and operations of the engine 100 and/or the machine. The functionality of the controller 222 may be implemented in hardware and/or software without regard to the functionality.

Figure 3:
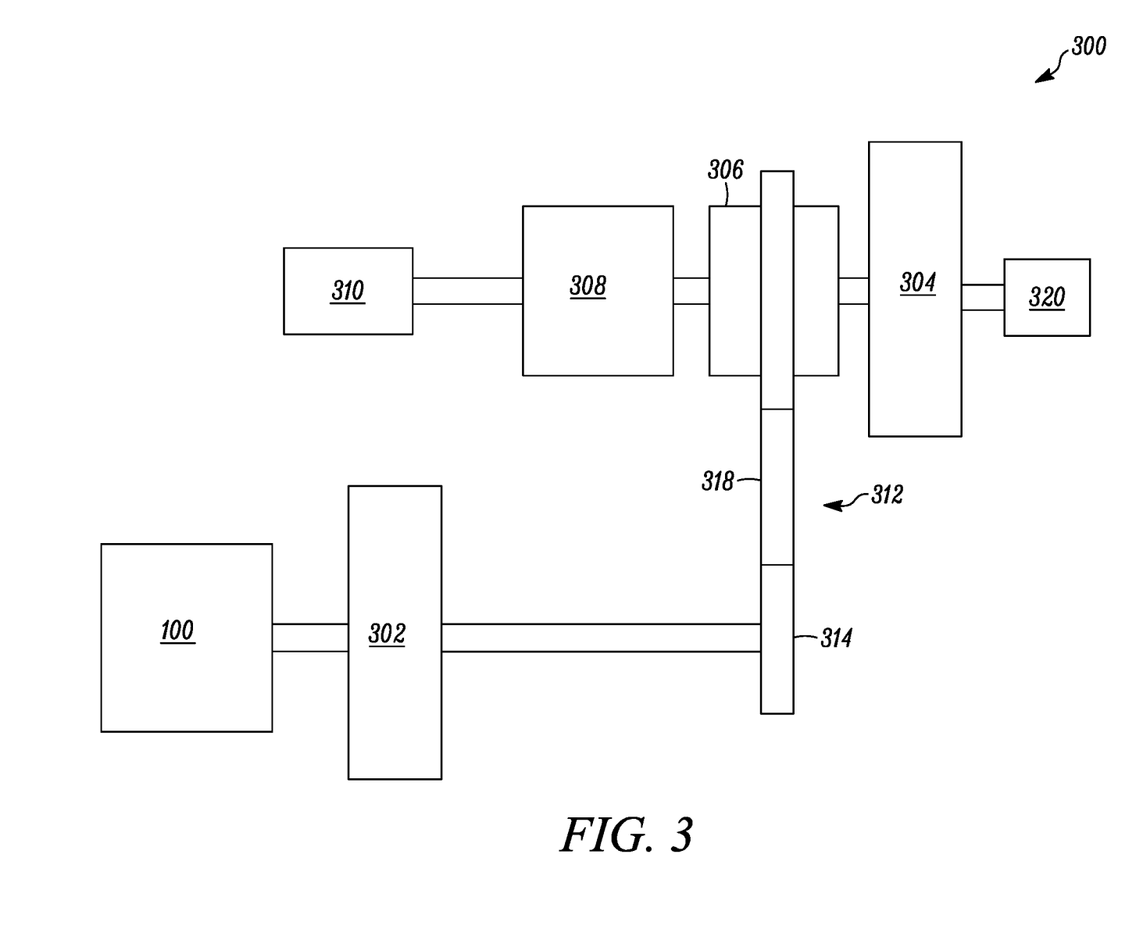
FIG. 3 is a schematic representation of the power transfer assembly of the engine of FIG. 1, according to another embodiment of the present disclosure.

Referring to FIG. 3, another configuration of the power transfer assembly 300 of the engine 100 is illustrated. In this configuration, the first flywheel 302 is indirectly coupled to the first transmission unit 306 by a belt-pulley unit 312. The belt-pulley unit 312 includes a drive pulley 314 coupled to the first flywheel 302. The belt-pulley unit 312 also includes a belt 318 connecting the drive pulley 314 to the first transmission unit 306. Alternatively, the first flywheel 302 may be indirectly coupled to the first transmission unit 306 by a chain-sprocket unit (not shown).

The first transmission unit 306 of the power transfer assembly 300 is a multi-clutch pulley. As such, the first transmission unit 306 includes multiple clutches and gear sets therein. The first transmission unit 306 is adapted to selectively transfer the mechanical power between the first flywheel 302, the second flywheel 304, and/or the second transmission unit 308 based on application requirements. The second transmission unit 308 of the power transfer assembly 300 is a Continuously Variable Transmission (CVT) unit. The second transmission unit 308 is coupled to the first transmission unit 306 and the engine accessory 310. The second transmission unit 308 is adapted to transfer the mechanical power from the first flywheel 302 or the second flywheel 304 further to the engine accessory 310.

More specifically, in one situation, the first transmission unit 306 may transfer the mechanical power from the first flywheel 302 to the second flywheel 304. In such a situation, the gear sets may provide increase in the speed of the second flywheel 304 with respect to the first flywheel 302. In another situation, the first transmission unit 306 may transfer the mechanical power from the second flywheel 304 to the second transmission unit 308. In such a situation, the gear sets may provide reduction in the speed of the second transmission unit 308 with respect to the second flywheel 304. In yet another situation, the first transmission unit 306 may transfer the mechanical power from the first flywheel 302 to the second transmission unit 308. In such a situation, the gear sets may provide increase or reduction in the speed of the second transmission unit 308 with respect to the first flywheel 302, based on application requirements.

The power transfer assembly 300 also includes the MGU 320 coupled to the second flywheel 304. In one operational state of the MGU 320 as the motor, the MGU 320 spins the second flywheel 304 for inertial starting of the engine 100. In another operational state of the MGU 320 as the alternator, the MGU 320 is operated by the second flywheel 304 in order to generate the electrical power.

INDUSTRIAL APPLICABILITY

Figure 4:
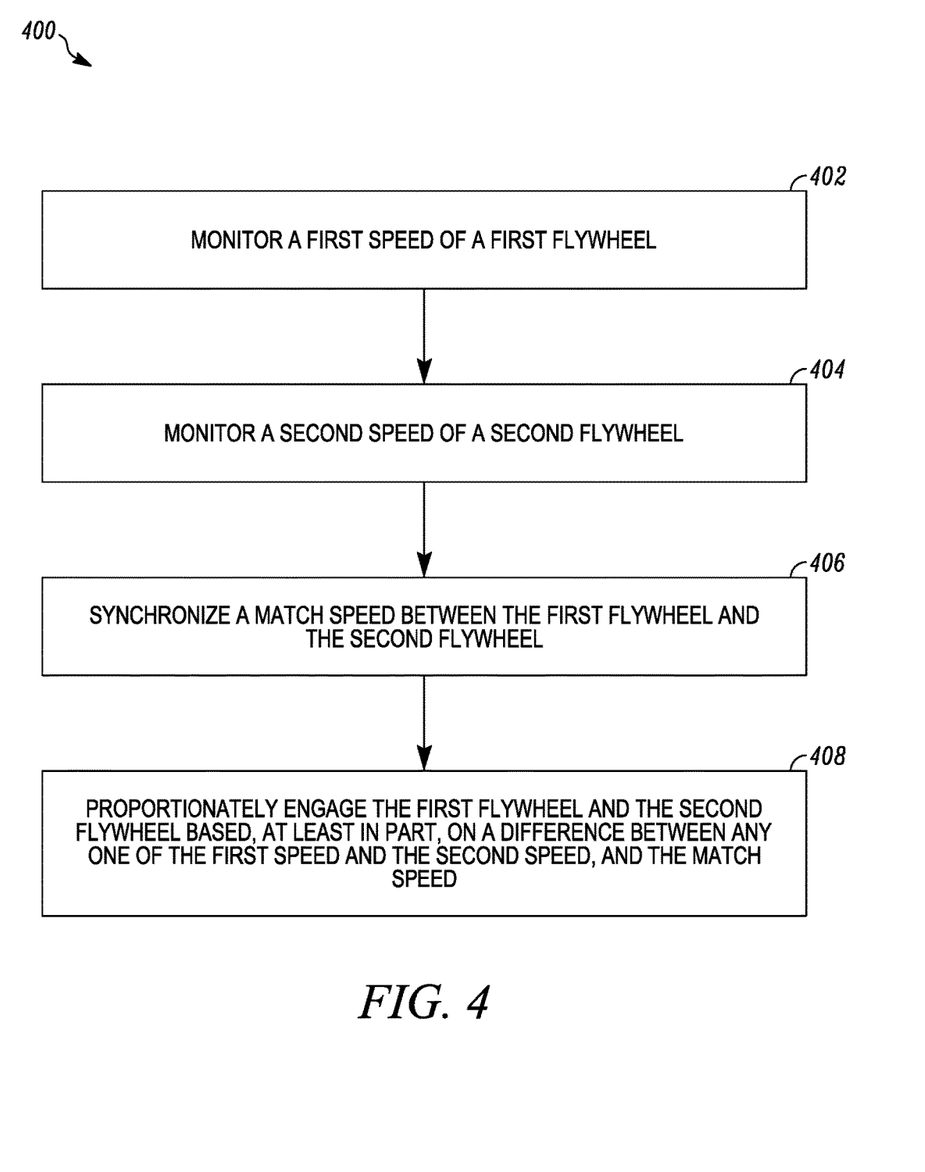
FIG. 4 is a flowchart for a method of controlling the power transfer assembly of FIG. 2, according to one embodiment of the present disclosure.

The present disclosure relates to a method 400 of controlling the power transfer assembly 200 of the engine 100. At step 402, the controller 222 monitors the first speed of the first flywheel 202. At step 404, the controller 222 monitors the second speed of the second flywheel 204. At step 406, the controller 222 synchronizes the match speed between the first flywheel 202 and the second flywheel 204. At step 408, the controller 222 proportionately engages the first flywheel 202 and the second flywheel 204 based, at least in part, on the difference between any one of the first speed and the second speed, and the match speed.

In one embodiment, the controller 222 monitors the reduction in the first speed of the first flywheel 202 with respect to the match speed. For example, the first speed may be reduced at an idle condition of the engine 100. Accordingly, the controller 222 disengages the first flywheel 202 and the second flywheel 204 based, at least in part, on the monitoring. More specifically, the controller 222 operates the first transmission unit 206 and disengages the first clutch in order to discontinue transfer of energy from the second flywheel 204 to the first flywheel 202.

In another embodiment, the controller 222 monitors the increase in the first speed of the first flywheel 202 with respect to the match speed. For example, the first speed may increase during acceleration of the engine 100. Accordingly, the controller 222 proportionately engages the first flywheel 202 and the second flywheel 204 based, at least in part, on the monitoring and the difference between the first speed and the match speed. More specifically, the controller 222 operates the first transmission unit 206 and proportionately engages the first clutch in order to transfer energy from the first flywheel 202 to the second flywheel 204.

In yet another embodiment, the controller 222 senses the first speed of the first flywheel 202 as zero. The controller 222 also senses the second speed of the second flywheel 204 at least equal to the predetermined speed. In such a situation, during rapid restarting of the engine 100, the controller 222 proportionately engages the first flywheel 202 and the second flywheel 204 based, at least in part, on the difference between the first speed and the second speed. More specifically, the controller 222 operates the first transmission unit 206 and proportionately engages the first clutch in order to transfer energy from the second flywheel 204 to the first flywheel 202.

The first flywheel 202, 302 of the power transfer assembly 200, 300 is employed as a conventional flywheel for the engine 100. The second flywheel 204, 304 is the high speed flywheel adapted to draw energy from the first flywheel 202, 302 and store therein. The second flywheel 204, 304 is employed to drive the engine accessory 210, 310 during operation of the engine 100. Further, when the engine 100 may be shut down, or during the idle condition of the engine 100, the stored kinetic energy within the second flywheel 204, 304 may be used to drive the engine accessory 210, 310 as and when required. Additionally, the second flywheel 204, 304 may also assist in rapid acceleration of the engine 100, rapid restarting of the engine 100, and various other operating conditions of the engine 100.

The engine 100 in conjunction with the second flywheel 204, 304 may satisfy a load spike. By actively controlling the first transmission unit 206, 306 or passively using a natural effect of inertia of the second flywheel 204, 304, the second flywheel 204, 304 desorbs the energy therein in order to satisfy the load spike on the engine 100. The second flywheel 204, 304 may also absorb and store energy therein when the engine 100 may be lightly loaded. As a result, the power transfer assembly 200, 300 may provide leveling of the load on the engine 100. Additionally, absorbing excess energy by the second flywheel 204, 304 may limit engagement of service brakes associated with the engine 100, in turn, increasing a life thereof.

The power transfer assembly 200, 300 may provide for an artificial torque rise. For example, the rated power of engine 100 may define a torque curve of the engine 100. Further, an artificial torque curve may be generated by controlling the second flywheel 204, 304 in conjunction with the engine 100. As a result, a high artificial torque may be provided in order to prevent the engine 100 against a high load, stalling, excessive speed lug, and so on.

The power transfer assembly 200, 300 may provide for an artificial torque fill. Torque fill may refer to providing continuity of torque flow during a disruption thereof by allowing the second flywheel 204, 304 to desorb energy stored therein. For example, engagement of the engine accessory 210, 310 such a cooling fan may result in a drop in the torque available for a transmission of the engine 100, other engine accessories 210, 310, and so on. In such a situation, the second flywheel 204, 304 may provide enough energy in order to offset the drop in the torque, prevent a drop in a speed of the machine, and so on. The artificial torque rise and/or torque fill may also provide for calibrating economical transmission shift points.

The power transfer assembly 200, 300 may provide retarding assist to the engine 100. For example, in a situation when the second flywheel 204, 304 may be rotating at a speed lower than a rated speed thereof, the second flywheel 204, 304 may be engaged during braking of the machine in order to absorb and store the energy within the second flywheel 204, 304 and provide retarding assist.

Similarly, the power transfer assembly 200, 300 may provide acceleration assist to the engine 100. For example, the engine 100 employing a turbocharger may exhibit a turbo lag during low engine speed in turn resulting in reduced acceleration. The engagement of the second flywheel 204, 304 during such a situation may provide acceleration assist to the engine 100 by desorbing the stored kinetic energy therein. Also, the power transfer assembly 200, 300 provides start assist to the engine 100 by transferring the stored kinetic energy from the second flywheel 204, 304 to the first flywheel 202, 302 during engine starting.

The power transfer assembly 200, 300 may provide downsizing of the engine 100 by providing an alternate energy source via the second flywheel 204, 304 in order to satisfy a peak load demand that may exceed a transient or steady state capacity of the engine 100. Further, by employing the second flywheel 204, 304 to meet various load demands such as high engine speed or low engine speed operation, the power transfer assembly 200, 300 may provide for an efficient engine system design.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A power transfer assembly for an engine, the power transfer assembly comprising:
   a first flywheel coupled to a crankshaft of the engine;
   a second flywheel selectively coupled to the first flywheel;
   a first transmission unit coupled to the first flywheel and the second flywheel, the first transmission unit adapted to selectively transfer mechanical power between the first flywheel and the second flywheel; and
   a second transmission unit coupled to the first transmission unit, the second flywheel, and an engine accessory, the second transmission unit adapted to selectively transfer mechanical power between any one of the first transmission unit and the second flywheel, and the engine accessory.

2. The power transfer assembly of claim 1, wherein the first transmission unit includes a first clutch and a first gear set.

3. The power transfer assembly of claim 1, wherein the second transmission unit includes a second clutch and a second gear set.

4. The power transfer assembly of claim 1, wherein the engine accessory is at least one of a pump, a fan, an alternator, and a Heating, Ventilation and Air Conditioning (HVAC) unit.

5. The power transfer assembly of claim 1, wherein the engine accessory is coupled to the second transmission unit by any one of a gear set, a belt-pulley unit, and a chain-sprocket unit.

6. The power transfer assembly of claim 1, wherein the first flywheel is coupled to the first transmission unit by any one of a belt-pulley unit and a chain-sprocket unit.

7. The power transfer assembly of claim 6, wherein the second transmission unit is a Continuously Variable Transmission (CVT) unit.

8. The power transfer assembly of claim 7, wherein the engine accessory coupled to the second transmission unit is a Heating, Ventilation and Air Conditioning (HVAC) unit.

9. An engine comprising:
a cylinder head;
an engine block;
a cylinder provided within the engine block;
a piston provided within the cylinder;
a crankshaft coupled to the piston; and
a power transfer assembly comprising:
a first flywheel coupled to the crankshaft;
a second flywheel selectively coupled to the first flywheel;
a first transmission unit coupled to the first flywheel and the second flywheel, the first transmission unit adapted to selectively transfer mechanical power between the first flywheel and the second flywheel; and
a second transmission unit coupled to the first transmission unit, the second flywheel, and an engine accessory, the second transmission unit adapted to selectively transfer mechanical power between any one of the first transmission unit and the second flywheel, and the engine accessory.

10. The engine of claim 9, wherein the first transmission unit includes a first clutch and a first gear set.

11. The engine of claim 9, wherein the second transmission unit includes a second clutch and a second gear set.

12. The engine of claim 9, wherein the engine accessory is at least one of a pump, a fan, an alternator, and a Heating, Ventilation and Air Conditioning (HVAC) unit.

13. The engine of claim 9, wherein the engine accessory is coupled to the second transmission unit by any one of a gear set, a belt-pulley unit, and a chain-sprocket unit.

14. The engine of claim 9, wherein the first flywheel is coupled to the first transmission unit by any one of a belt-pulley unit and a chain-sprocket unit.

15. The engine of claim 14, wherein the second transmission unit is a Continuously Variable Transmission (CVT) unit.

16. The engine of claim 9 further includes a Motor Generator (MG) unit coupled to the second flywheel.

* * * * *